(12) United States Patent
Cooke et al.

(10) Patent No.: US 8,666,057 B2
(45) Date of Patent: Mar. 4, 2014

(54) REMOTE POWERING OF DSL ADMS

(75) Inventors: Stephen Peter Cooke, Rocky View (CA); Tino Zottola, Beaconsfield (CA)

(73) Assignee: Genesis Technical Systems Corp., Calgary, Alberta (CA)

( * ) Notice: Subject to any disclaimer, the term of this patent is extended or adjusted under 35 U.S.C. 154(b) by 1491 days.

(21) Appl. No.: 12/243,061

(22) Filed: Oct. 1, 2008

(65) Prior Publication Data
US 2009/0092242 A1    Apr. 9, 2009

Related U.S. Application Data

(60) Provisional application No. 60/977,381, filed on Oct. 4, 2007.

(51) Int. Cl.
*H04M 3/00* (2006.01)
*H04M 1/00* (2006.01)

(52) U.S. Cl.
USPC ...................................... 379/324; 379/413.01

(58) Field of Classification Search
USPC .............. 379/322–324, 413–413.03
See application file for complete search history.

(56) References Cited

U.S. PATENT DOCUMENTS

| | | | |
|---|---|---|---|
| 4,733,391 A | | 3/1988 | Godbold et al. |
| 4,757,497 A | | 7/1988 | Beierle et al. |
| 4,835,763 A | | 5/1989 | Lau |
| 5,159,595 A | | 10/1992 | Flanagan et al. |
| 5,907,548 A | * | 5/1999 | Bernstein ...................... 370/353 |
| 6,052,380 A | | 4/2000 | Bell |
| 6,282,189 B1 | | 8/2001 | Eames |
| 6,389,030 B1 | | 5/2002 | Coden |
| 6,466,033 B2 | | 10/2002 | Soghomonian |
| 6,480,487 B1 | | 11/2002 | Wegleitner et al. |
| 6,577,621 B1 | | 6/2003 | Balachandran |
| 6,584,197 B1 | * | 6/2003 | Boudreaux et al. ...... 379/413.02 |
| 6,611,537 B1 | | 8/2003 | Edens et al. |
| 6,618,578 B1 | | 9/2003 | Petite |
| 6,647,117 B1 | | 11/2003 | Wallace et al. |

(Continued)

FOREIGN PATENT DOCUMENTS

| | | |
|---|---|---|
| CN | 1230064 A | 9/1999 |
| EP | 1 239 622 | 9/2002 |

(Continued)

OTHER PUBLICATIONS

Extended European Search Report dated Oct. 10, 2011 in respect of European Patent Application No. 06775081.0 , 7 pages.

(Continued)

*Primary Examiner* — Duc Nguyen
*Assistant Examiner* — Sonia Gay (57) ABSTRACT

Apparatus and methods of remote powering of DSL ADMs are disclosed. In a subscriber communication node, at least communication components that enable the subscriber communication node to communicate with a network switching device, and possibly also subscriber communication components that enable one or more subscriber communication devices to communicate with the network switching device, can be powered either by a local power source or remotely through an electrically conductive twisted wire pair. A network node may derive its own power and also supply power to subscriber communication nodes through twisted wire pairs. A linear or ring topology of subscriber communication nodes can thus be kept operational, and subscriber communications can potentially also be maintained, when a local power source at one or more subscriber nodes becomes unavailable.

26 Claims, 8 Drawing Sheets

(56) References Cited

U.S. PATENT DOCUMENTS

| | | |
|---|---|---|
| 6,754,174 B1 | 6/2004 | Ben-Zur et al. |
| 6,798,769 B1 | 9/2004 | Farmwald |
| 6,847,718 B1* | 1/2005 | Hiraoka ................. 379/413 |
| 6,999,479 B1 | 2/2006 | Jha |
| 7,043,250 B1 | 5/2006 | DeMartino |
| 7,058,174 B2 | 6/2006 | Posthuma |
| 7,099,287 B1 | 8/2006 | Oz et al. |
| 7,197,768 B2 | 3/2007 | Cole et al. |
| 2002/0101851 A1* | 8/2002 | Blake et al. ............... 370/352 |
| 2002/0191760 A1* | 12/2002 | Wattwood et al. ......... 379/93.01 |
| 2003/0108063 A1 | 6/2003 | Joseph et al. |
| 2004/0027992 A1* | 2/2004 | Volkening et al. ........... 370/241 |
| 2004/0041697 A1* | 3/2004 | Nattkemper et al. .... 340/310.01 |
| 2004/0264440 A1 | 12/2004 | Wan et al. |
| 2005/0013292 A1* | 1/2005 | Johnson et al. ............ 370/352 |
| 2005/0265262 A1 | 12/2005 | Mizuguchi et al. |
| 2006/0064479 A1 | 3/2006 | Meged et al. |

FOREIGN PATENT DOCUMENTS

| | | |
|---|---|---|
| JP | 4284048 A | 10/1992 |
| JP | 5046280 A | 2/1993 |
| JP | 5284170 A | 10/1993 |
| JP | 7050683 A | 2/1995 |
| JP | 7288492 A | 10/1995 |
| JP | 8130549 A | 5/1996 |
| JP | 2000517140 A | 12/2000 |
| JP | 2001230794 A | 8/2001 |
| JP | 2004530381 A | 9/2004 |
| JP | 2004336499 A | 11/2004 |
| RU | 2127960 C1 | 3/1999 |
| WO | 9510917 A1 | 4/1995 |
| WO | WO98/26531 | 6/1998 |
| WO | WO99/09713 | 2/1999 |
| WO | WO99/39478 | 8/1999 |
| WO | WO03/077459 | 9/2003 |

OTHER PUBLICATIONS

English language translation of Abstract for Japanese Application No. JP 2000517140, (Dec. 19, 2000), 1 page.
English language translation of Abstract for Japanese Application No. JP 2001230794, (Aug. 24, 2001), 1 page.
English language translation of Abstract for Japanese Application No. JP 2004336499, (Nov. 25, 2004), 1 page.
English language translation of Abstract for Japanese Application No. JP 2004530381, (Sep. 30, 2004), 1 page.
English language translation of Abstract for Japanese Application No. JP 4284048, (Oct. 8, 1992), 1 page.
English language translation of Abstract for Japanese Application No. JP 5046280, (Feb. 26, 1993), 1 page.
English language translation of Abstract for Japanese Application No. JP 5284170, (Oct. 29, 1993), 1 page.
English language translation of Abstract for Japanese Application No. JP 7050683, (Feb. 21, 1995), 1 page.
English language translation of Abstract for Japanese Application No. JP 7288492, (Oct. 31, 1995), 1 page.
English language translation of Abstract for Japanese Application No. JP 8130549, (May 21, 1996), 1 page.
English language translation of the Official Action for Japanese Application No. JP 2008525345, (Dec. 27, 2011), 4 pages.
Non-Final Office Action for U.S. Appl. No. 11/463,240 including Notice of References Cited, (Feb. 17, 2009), 29 pages.
Final Office Action for U.S. Appl. No. 11/463,240 including Notice of References Cited, (Sep. 3, 2009), 30 pages.
Advisory Action (PTOL-303) for U.S. Appl. No. 11/463,240, (Dec. 7, 2009), 3 pages.
Notice of Panel Decision from Pre-Appeal Brief Review for U.S. Appl. No. 11/463,240, (Mar. 15, 2010), 2 pages.
Non-Final Office Action for U.S. Appl. No. 11/463,240 including Notice of References Cited, (Jun. 8, 2010), 28 pages.
Final Office Action for U.S. Appl. No. 11/463,240 including Notice of References Cited, (Nov. 23, 2010), 25 pages.
Advisory Action (PTOL-303) for U.S. Appl. No. 11/463,240, (Feb. 28, 2011), 3 pages.
Advisory Action (PTOL-303) for U.S. Appl. No. 11/463,240, (Apr. 27, 2011), 3 pages.
Notice of Allowance and Fee(s) Due (PTOL-85) including Notice of Allowability (PTOL-37) for U.S. Appl. No. 11/463,240, (Oct. 4, 2011), 7 pages.
Patent Withdrawal Notice (PTO-302) for U.S. Appl. No. 11/463,240, (Feb. 2, 2012), 1 pages.
Notice of Allowance and Fee(s) Due (PTOL-85) including Notice of Allowability (PTOL-37) for U.S. Appl. No. 11/463,240, (Feb. 24, 2012), 8 pages.
English language translation of the Office Action for Chinese Patent Application No. 200680029482.7, (Nov. 9, 2011), 12 pages.
International Search Report for International Application No. PCT/CA2006/001299 (3 pages).
Written Opinion of the International Searching Authority for International Application No. PCT/CA2006/001299 (8 pages).
International Preliminary Report on Patentability for International Application No. PCT/CA2006/001299 (9 pages).
Russian Patent Application No. 2008108983/09(009718) "Decision on Grant", and English Translation, Mar. 30, 2011, 18 pages.

* cited by examiner

FIG. 8

REMOTE POWERING OF DSL ADMS

CROSS-REFERENCE TO RELATED APPLICATION

The present application claims the benefit of U.S. Provisional Patent Application Ser. No. 60/977,381, entitled "REMOTE POWERING OF DSL ADMS", filed on Oct. 4, 2007. The entire contents of this provisional application are incorporated herein by reference.

FIELD OF THE INVENTION

This invention relates generally to communications and, in particular, to remote powering of DSL (Digital Subscriber Line) components.

BACKGROUND

DSL ADMs & Rings, such as disclosed in U.S. patent application Ser. No. 11/463,240, filed on Aug. 8, 2006, and in U.S. Provisional Patent Application Ser. No. 60/706,022, filed on Aug. 8, 2005, the entire contents of both of which are incorporated herein by reference, represent a new and powerful reconfiguration of existing telecom network resources. Bonded DSL Rings that maintain their ability to be a source of communications in difficult technical circumstances, such as when power to homes and/or offices in which they are deployed fails, may make the most of these reconfigured resources.

In the past, telecom networks had a so-called "5 9's" or 99.999% uptime guarantee. This was only possible by providing multiple stages of fail safes and backups and did not generally apply to the "Last Mile" or the actual link to the customer. Most telecom COs (Central Offices) were equipped with multiple power grid feeds and large battery arrays that were kept charged in case the power went out and people needed help.

With the advent of VoIP (Voice-over-IP) over Cable networks, it was not economically possible for cable service providers (in the United States these are often referred to as MSO's—Multi-Service Operators) to provide power to network access devices using their already deployed cable plant. As cable providers have been allowed to provide voice communications services, telcos might now see the requirement to provide service in emergency situations as an "unfair tax", because they still need to provide this service whereas cable companies do not face a similar requirement. Being able to provide this service is not free, and telcos see this making them uncompetitive in the current communications market.

SUMMARY OF THE INVENTION

According to an aspect of the invention, a subscriber communication node is provided, and includes: network communication components that enable the subscriber communication node to communicate with a network switching device; subscriber communication components, operatively coupled to the network communication components, that enable one or more subscriber communication devices to communicate with the network switching device; and a powering arrangement that enables subscriber communication node components including at least the network communication components to be powered either by a local power source or remotely through an electrically conductive twisted wire pair.

In some embodiments, the powering arrangement comprises a power domain separator operatively coupled between the local power source and the subscriber communication node components that are to be powered either by the local power source or remotely.

In some embodiments, the power domain separator comprises one or more of: a diode, a switch, and a relay.

In some embodiments, the twisted wire pair and the powering arrangement further support Plain Old Telephone Service (POTS) communications for a subscriber communication device.

In some embodiments, the twisted wire pair is driven at a powering current and/or voltage level that is different from a communication current and/or voltage level.

In some embodiments, the powering arrangement comprises a power converter that converts a voltage and/or current level on the twisted wire pair to a voltage and/or current level for use by the components to be powered either by the local power source or remotely.

In some embodiments, the twisted wire pair is operatively coupled to the network switching device through a gateway node in a pedestal.

In some embodiments, the network communication components enable the subscriber communication node to communicate with the network switching device in a ring topology.

In some embodiments, the network communication components enable the subscriber communication node to communicate with the network switching device in a linear topology.

In some embodiments, the network communication components comprise an ADM (Add/Drop Multiplexer).

In some embodiments, the network communication components enable the subscriber communication node to communicate with the network switching device via DSL (Digital Subscriber Line) communications.

In some embodiments, the DSL communications are of a type selected from a group consisting of: ADSL (Asynchronous DSL), ADSL2+, SDSL (Symmetric DSL), Uni-DSL (Universal DSL), VDSL (Very high bit rate DSL), and VDSL2 (Very high bit rate DSL version 2).

In some embodiments, the local power source comprises one or more of: household power mains, a power cell, and a battery.

In some embodiments, the battery is charged by the household power mains or remotely through the twisted wire pair.

In some embodiments, the network communication components enable the subscriber communication node to communicate with the network switching device through an optical communication medium.

There is also provided a method comprising: providing an electrically conductive twisted wire pair connection to a subscriber communication node, the subscriber communication node comprising network communication components that enable the subscriber communication node to communicate with the network switching device, and subscriber communication components that enable one or more subscriber communication devices to communicate with the network switching device; and powering at least the network communication components of the subscriber communication node remotely through the twisted wire pair and the network switching device where a local power source of the subscriber communication node becomes unavailable.

A network node is also provided, and comprises: a twisted wire pair interface for connection to a plurality of twisted wire pairs, the plurality of twisted wire pairs being operatively coupled to a network switching device; communication components that enable subscriber communication nodes, associated with communication service subscribers and interconnected with the network communication node in a ring or linear topology, to communicate with the network switching device; and a powering arrangement that enables the communication components and/or the subscriber communication nodes to be powered remotely through the twisted wire pairs.

In some embodiments, the communication components further support Plain Old Telephone Service (POTS) communications with the subscriber communication nodes.

In some embodiments, the twisted wire pairs are driven at a powering current and/or voltage level that is different from a communication current and/or voltage level.

In some embodiments, the powering arrangement comprises a power converter that converts a voltage and/or current level on the twisted wire pairs to a voltage and/or current level for use by the communication components and/or the subscriber communication nodes.

In some embodiments, the network node comprises a gateway node in a pedestal.

In some embodiments, the communication components enable the subscriber communication nodes to communicate with the network switching device via DSL (Digital Subscriber Line) communications.

In some embodiments, the DSL communications are of a type selected from a group consisting of: ADSL (Asynchronous DSL), ADSL2+, SDSL (Symmetric DSL), Uni-DSL (Universal DSL), VDSL (Very high bit rate DSL), and VDSL2 (Very high bit rate DSL version 2).

In some embodiments, the powering arrangement further enables the network node to be powered from a local power source, or remotely from the network switching device as a backup to the local power source.

In some embodiments, the plurality of twisted wire pairs comprises twisted wire pairs that are operatively coupled to the subscriber communication nodes and can be used to power the subscriber communication nodes, and twisted wire pairs that terminate at the network node and can be used to power the communication components.

In some embodiments, the local power source comprises one or more of: power mains, a power cell, and a battery.

In some embodiments, the battery is charged by the power mains or remotely through the twisted wire pair.

In some embodiments, the communication components enable the subscriber communication nodes to communicate with the network switching device through an optical communication medium.

In some embodiments, the network switching device is selected from a group consisting of a central office, a DLC (digital loop carrier) node, a fiber-fed node, and a network POP (point of presence) node.

There is also provided a method comprising: providing a plurality of twisted wire pair connections between a network node and a network switching device, the network node comprising communication components that enable subscriber communication nodes, associated with communication service subscribers and interconnected with the network communication node in a ring or linear topology, to communicate with the network switching device; and powering the communication components and/or the subscriber communication nodes remotely through the twisted wire pairs.

According to another aspect of the invention, a wireline network comprises: at least one network connection connecting at least one telephony network switching device to a respective first customer communication node; a plurality of second customer communication nodes; a plurality of interconnections between the communication nodes such that all communication nodes are interconnected in a linear manner and have at least one communication path to the network switching device, each interconnection comprising at least an electrically conductive twisted wire pair; and a powering arrangement in each customer communication node to provide power to at least some components of the customer communications node from the twisted wire pair. The interconnections may also include optical fiber connections, for instance.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Embodiments of the present invention may be applied, for example, to DSL Rings as disclosed in the above-referenced patent applications. Therefore, a brief description of bonded DSL Rings is provided below.

Star Topology

Those familiar with DSL communications will appreciate that in one known network topology for connecting copper pairs between households and a CO, many households or customer sites are interconnected with a single CO using twisted pair cables in a star network topology. The interconnections are generally referred to as the "last mile".

The transmission bandwidth of technologies such as DSL and Ethernet decreases with distance. In a star network architecture, the DSLAM (DSL Access Multiplexer) is physically located in the middle, but the distance to each subscriber is often greater than the short distance required for maximum bandwidth. Since the telecom carriers wish to increase bandwidth to their customers, they need to keep the twisted pair distances as short as possible.

Ring Topology

Figure 1:
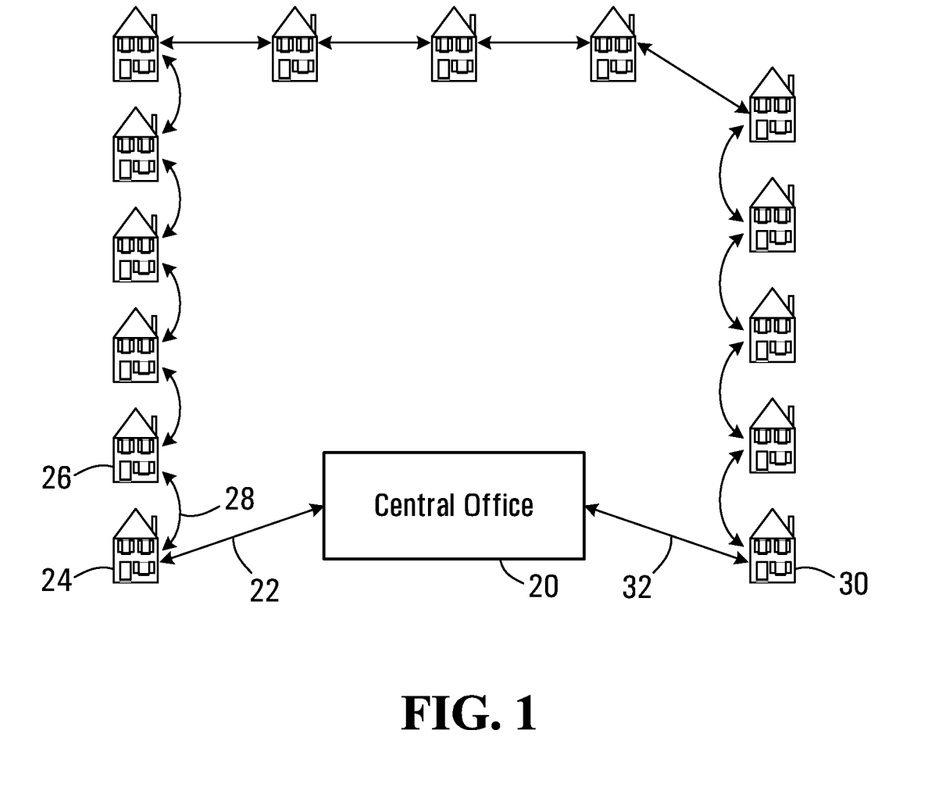
FIG. 1 is a block diagram of an example ring network topology for connecting copper pairs between households and a CO.

Referring now to FIG. 1, shown is an example ring network topology for connecting copper pairs between households and a CO. While throughout this description copper pairs are referred to, more generally any electrically conducting twisted wire pairs can be employed. Many households 24, 26, . . . , 30 and a single CO 20 are interconnected using twisted pair cables in a ring network topology. More specifically, the CO 20 is connected to a first household 24 with twisted pair cables 22; the first household 24 is connected to second household 26 with twisted pair cable 28 and so on to the last household 30, which is connected to the CO 20 with twisted pair cables 32. Each household has a customer communications node that provides packet add/drop functionality. In a particular example, the customer communications node is an HCC (Home Communications Centre), which enables DSL ring topologies in telecom service provider networks. Example HCCs are described in detail below with reference to FIGS. 2 and 5. A 'Ring' is a special case of the more general 'Daisy Chain of Add/Drop Multiplexers (ADMs)' where the 'Ring' goes out from, and returns to, the same gateway node, which may, but need not necessarily be, a CO. Another example would be a set of ADMs between two different COs or even a serially-connected network 'stub' sometimes referred to as a linear ADM (i.e., a set of ADMs that initiates from a particular gateway node, but terminates at another gateway node).

By physically, electrically, and/or logically connecting the twisted pair cables of customers so that the electrical distance is less than the maximum bandwidth distance of the layer 1 technology, service can be provided to subscribers at much greater distances from the DSLAM with very little investment in additional "last mile" cabling. Twisted pair rings greatly increase the distance and bandwidth carrying capability of the 'local loop'. High bandwidth is made available to the households by reducing the transmission distance to that between households instead of between households and gateway nodes or Central Offices. Maximum bandwidth is obtained if the distance between houses connected together is less than the maximum bandwidth distance.

In some embodiments, existing "last mile" cables are utilised by the ring network. Existing "last mile" cables may include several copper pair wires bundled together extending out from a CO to several households. Copper pair wires may exist between households, but are connected between the household and the CO. By appropriately cutting a copper pair wire between a second house downstream in the cable from a first house and the CO and routing the cut end to a second house, a connection between two households is established using the existing cable. This process may be repeated to form complete ring network topologies. There may exist intermediate, non-powered technician access points in the larger cables. In some cases it may be possible to achieve the ring topology by simply "jumpering" twisted pairs together inside these access points so that no actual "cutting of wires" is necessary.

In some implementations, once the new topology is available, a complete package of services with a documented feature evolution is implemented. The complete package may for example include combinations of features such as Internet Home Theatre or Internet Protocol TeleVision (IPTV), Automatic Meter Reading (AMR), Home Security Monitoring, Virtual Private Networking, Internet Security and Connection Maintenance (i.e., platform updates performed without customer intervention), and Medical Aid Monitoring.

HCC (Home Communications Centre)

Figure 2:
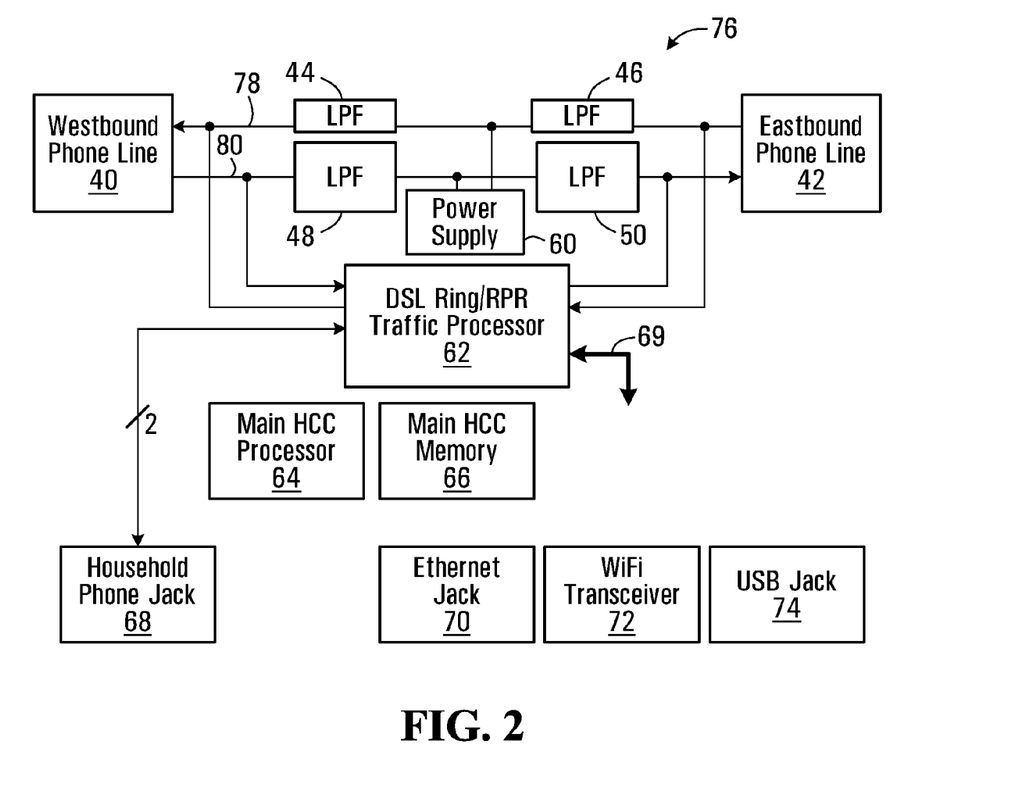
FIG. 2 is a block diagram of an example HCC (Home Communications Centre).

Referring now to FIG. 2, shown is a block diagram of an example HCC (Home Communications Centre) generally indicated at 76. It is to be understood that the HCC 76 shown in FIG. 2 is very specific for example purposes only. In general, equipment in conjunction with which embodiments of the present invention may be implemented may include fewer, further, or different components, interconnected in a similar or different manner than shown.

The HCC 76 is coupled to a westbound phone line 40 and an eastbound phone line 42. References to "eastbound" and "westbound" do not of course necessarily imply east or west, but simply the two directions that the ring can be connected to a given HCC. Each phone line has a copper pair of wires. The HCC has a DSL Ring/RPR traffic processor 62 coupled to the westbound phone line and the eastbound phone line. The HCC also has a main HCC processor 64 and a main HCC memory 66. A power supply 60 is coupled to the westbound phone line 40 and the eastbound phone line 42 via respective LPFs (low pass filters) 44, 46, 48, 50. A household phone jack 68 is coupled to the DSL Ring/RPR traffic processor 62. Other possible interfaces include an Ethernet jack 70, a WIFI transceiver 72, and a USB jack 74. There may be other components, but they are not shown for sake of simplicity. The traffic processor 62 has add/drop ports 69 that connect the various interfaces to the traffic processor.

In operation, the combination of the DSL Ring/RPR traffic processor 62, the main HCC processor 64, and the main HCC memory 66 is adapted to process all communications over the westbound phone line 40 and/or the eastbound phone line 42. Processing communications includes packet add/drop functionality. For example, if the DSL Ring/RPR traffic processor 62 receives a packet on the westbound phone line 40, it may handle the packet if it is addressed to the present HCC 76, or forward the packet to its destination via the eastbound phone line 42 if it is addressed to another HCC. In some implementations, packets are routed on a per packet basis. The HCC 76 may also generate packets associated with a local communication device and forward the packets to their destination. In some embodiments, protection switching of traffic is handled by an industry-standard protocol designed specifically for this task. An example of this would be Resilient Packet Ring (RPR, IEEE 802.17) technology. RPR was developed for the optical transport infrastructure, but might also be adapted to fit well into this application.

There are two twisted copper pairs: the eastbound phone line 40, and the westbound phone line 42 (i.e., in opposite directions). In some implementations, communication over a phone line is bi-directional. In some embodiments, the data rate is symmetrical (i.e., transmit bit rate=receive bit rate) for both Eastbound and Westbound directions. A similar approach can be used on the eastbound phone line 42. In some embodiments, flow control mechanisms are used so that the data rate is the same around the ring and so that there are no links that are faster than others. A given household may communicate with the CO by an Eastbound path and/or a Westbound path. In some implementations, if communication on a ring via one direction is not possible, then communication via the other direction is attempted.

Since a number of households are occupying a single ring, there is generally no baseband channel available for each household for analogue communication although it would be technically feasible to provide a single baseband channel in each direction, for example to a first household in each direction. As such (in the most likely scenario), conventional POTS (Plain Ordinary Telephone Service) communications such as telephone and FAX are also digitized and sent on the ring. Thus, communication over the eastbound phone line and the westbound phone line is digital only, for example using DSL communication. Accordingly, if analog devices, such as analog telephones and fax machines, are to be interfaced with the HCC, then the HCC needs to provide D/A (digital to analogue) and A/D (analogue to digital) conversions. Such conversions are not necessary for interfacing the HCC with digital communication devices. Also, in such implementations, the CO ensures that communication transmitted to an HCC is digital. Digital communication comprises data packet communication. DSL communication is an example of digital communication.

Another possible option would be to provide support for baseband POTS and implement each ring in the form of a DSL frequency overlay.

The household phone jack 68, the Ethernet jack 70, and the WiFi transceiver 72 provide communication interfaces for the household. The USB jack 74 enables memory and maintenance access for the HCC 76 when it is installed. The HCC 76 may be installed in a residence and preferably remains with the residence permanently. This can be used to enable AMR (automatic meter reading) functionality. In some implementations, the architecture combines existing home phones with mobile phones. This may for example include most recent and/or backward compatible wireless interfaces. In some embodiments, the HCC 76 has a wireless interface, for example the WiFi (IEEE 802.11a/b/g/n) interface 72 to enable communication with wireless devices, for example wireless appliances, stereos, PCs, TVs, meters, mobile phones, Set Top Boxes (STBs), etc.

In some implementations, a QoS (quality of service) is provided so as to provide certain communications with greater priority than other communications. A list of example communications with decreasing priorities may be VoIP communication, streaming video communication, and non-streaming data communication. Having a greater priority provides streaming communication with a greater likelihood of being uninterrupted and having less latency and/or jitter. In some implementations, a COS (class of service) is used as detailed in the RPR specification so as to prioritize traffic on the ring. This enables carriers to sell what are referred to as SLAs (service level agreements) to their customers based on traffic volume at each priority level. For example, customer A gets N GB/month of Priority 1 traffic and M GB/month of Priority 2 traffic, etc. while customer B may get totally different traffic profiles.

In some embodiments, the HCC is partially powered from the phone lines so there is no dependency on household current supply for land line-based phone service. In some implementations, the household phone jack 68 and the traffic processor 62 are powered by at least one of the phone lines while the remaining components may be powered by household current (i.e., these components would be 'plugged in'). For example, each phone line could supply power via the potential difference between the first copper wire 78 at −48V and the second copper wire 80 at 0V in a DC-based architecture. The LPFs 44, 46, 48, 50 remove digital signals from the westbound phone line 40 and the eastbound phone line 42. By using power from the phone line, lightning threats to CO equipment are reduced, as the lightning strike could be eliminated or reduced by the first homes that it touches in either direction.

In some embodiments, the traffic processor 62 controls the traffic that is on the ring via the RPR protocol and VDSL2 standards. For such implementations, it also controls the VDSL2 interface chips. It will also control bandwidth asymmetry and any protection switching activity, for instance. The main processor 64 might for example implement functions such as the firewall/VPN, control of the WiFi interface, control communications with the network, access rule implementations (i.e., user authentication, WiFi interface logical segmentation between users, SLA policing, etc.), possibly interface conversions as necessary (e.g.: USB), etc.

The number of HCCs that may be interconnected in a ring network is implementation specific. An example design consideration is the maximum number of HCCs that can be partially powered solely from the phone line so as to enable high impedance user devices to operate during a power failure. A low current consumption user device is a user device that does not draw a significant amount of current and can be powered solely by a phone line. A telephone that does not require a power connection is an example of a low current consumption user device. Under normal conditions, each HCC is plugged in so that it receives power from its household power. However, during a power failure, the household power may be absent. In some embodiments, the HCC has a local power supply that receives power from the phone line so that during a power failure the local power supply partially powers the HCC and powers a high impedance user device so that the user may operate the high impedance user device. In such implementations, a user is provided with at least basic telephony functionality during a power failure.

The ring topology and the HCC involve modification to the "last mile". The "last mile" has been seen as 'untouchable' for many reasons. First, it provides the customer with the perception that the bandwidth they have is not shared with other customers. This is true only until the traffic reaches the first access multiplexer in the network. From that point onwards all bandwidth is shared. Second, the star topology allows the telecom carrier to provide power to older 'black' telephones (e.g.: those that do not have power cords) so that phone calls can still be made during a power failure. In some implementations, the HCC takes this into account and offers the capability to be powered from the telecom carrier Central Office (CO). Third, having a star topology means that no one else can 'listen' to another's phone calls, as there is no one else in the transmission path. In some implementations, the HCC provides similar capability via encryption.

Regarding the encryption of traffic, in some embodiments all traffic is encrypted around the ring so that no one will be able to 'listen' to another's traffic. The encryption may be end-to-end in nature (e.g.: between a user's PC and a server somewhere on the Internet) or simply around the ring as far as the gateway node (which will remove the encryption prior to sending it to the DSLAM in the CO).

It is to be understood that other implementations of the HCC are possible. In the illustrated example, specific example interfaces are shown. In a specific example, the HCC has an Internet firewall/VPN (Virtual Private Network), 2 or 3 phone jacks (RJ11), a USB port for memory and maintenance access, a WiFi interface, and an EtherNet cable jack (RJ45). However, more generally, any suitable interface or combination of suitable interfaces may be implemented. Also in the illustrated example, processing is accomplished using a specific implementation of processors and memory. More generally, processing may be accomplished using any appropriate implementation of software, hardware, firmware, or any appropriate combination of software, hardware and firmware. The minimum functionality that needs to be included in each communications node is a traffic add/drop function. In the above example this is implemented in the traffic processor but other implementations are possible.

Other Wireline Topologies

The above description has focused on a ring topology. However, it is to be understood that a ring topology is not required. More generally, any appropriate topology interconnecting communication nodes may be implemented. A "communication node" generally refers to any node adapted to communicate with other nodes. A communication node may be a customer communication node, which is a node having an HCC and being associated with a user or household, or a central office communication node, which is a node associated with a central office. At least one of the nodes functions as a network switching device to interconnect the subscriber ring to the network. This node accepts traffic from the ring and forwards it on, and receives traffic for the ring and puts it onto the ring. In the example of FIG. 1, the network switching device is a central office while in the example of FIG. 3 described below, the network switching device is a gateway node in a pedestal; also known as a splice box or a distribution point. More generally still, the network switching device can be physically placed at any point, including mid-span, between the CO and the first customer. Of course, increasing the distance to the first customer will reduce the bandwidth capabilities on that link.

An example of another topology is a linear ADM or "Daisy Chain" topology. A linear ADM topology may be implemented whereby a set of communication nodes are connected together in series. A ring topology is a topology in which two end communication nodes are interconnected.

Other Ring Network

Figure 3:
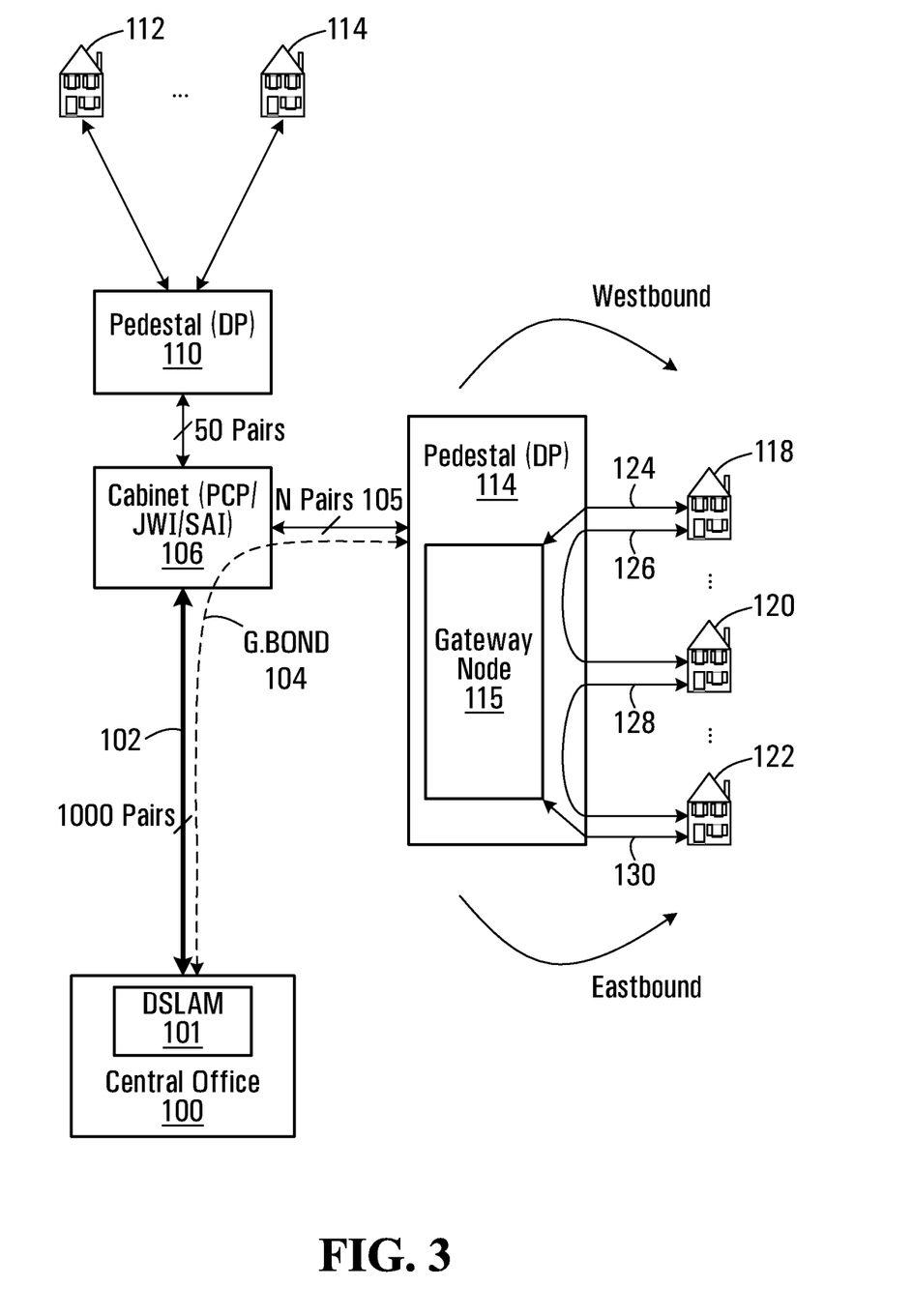
FIG. 3 is a block diagram of another network containing both a star implementation and a ring network topology.

Referring now to FIG. 3, another example of a DSL ring network is shown. A set of households 118, 120, 122 are connected in a ring configuration. The first household 118 is connected via 124 to a gateway node 115 forming part of pedestal 114. Similarly, household 122 is connected via 130 to the gateway node 115. The remaining households are connected in a ring similar to that of FIG. 1, but in this case the connections between consecutive houses on the ring go back through the pedestal 114. Thus, a connection 126 is shown between households 118 and 120, and a connection 128 is shown between households 120 and 122. More generally, an arbitrary number of households would be included on the ring. The pedestal 114 is shown connected via N Pairs 105 to a cabinet 106 (often called a Primary Connection Point—PCP—or Jumper Wiring Interface—JWI—or Service Access Interface—SAI—depending on the terminology of the network operator) which in turn is connected to a central office 100 having a DSLAM 101. The Pedestal 114 is connected to the Central Office 100 via the N Pairs 105 and N of the 1000 pairs 102 in a manner similar to that described in G.Bond (ITU 998.1/2/3) 104. For the purpose of comparison, also shown is a conventional pedestal 110 connected to households 112, 114 in a star topology.

A pedestal typically includes a number of incoming pairs from a network, a patch panel that allows the connection of any pair going to a specific household to any of the incoming pairs. Thus for the conventional pedestal 110, the patch panel would allow households 112, 114 to be arbitrarily connected to respective ones of the 50 pairs incoming to the pedestal 110.

For the pedestal 114 that is participating in the DSL ring, only pairs 124 and 130 are connected to the gateway node 115. The remaining connections are between adjacent households. This can be achieved by making connections on a patch panel that forms part of the pedestal 114. For example, the interconnection 126 between households 118 and 120 can be achieved by connecting a jumper cable between a first pair going from the pedestal to the first household 118, and a second pair going to the second household 120. In this manner the configuration of the DSL ring is very flexible and can easily be changed by simply modifying the set of patches. In the illustrated example, the bandwidth from the central office 100 to the pedestal 114 is provided through the previously introduced bonding approach.

In particular, a set of pairs from the DSLAM 101 can be grouped as a logical pipe that provides higher bandwidth than individual pairs. This logical pipe is then used to transmit packets to and from the gateway node 115 and any of the households on the DSL ring. For example, assuming individual pairs between the DSLAM 101 and the gateway node 115 support 4 Mb/s each, this being a function of the distance between the DSLAM 101 and the gateway node 115, and 32 such pairs can be combined to produce 128 Mb/s bandwidth; this may be passed around the ring with 64 Mb being transmitted in each direction by the gateway node 115. Regarding the availability of double the maximum VDSL2 bandwidth, home routers may be able to handle less than this amount, for example 100 Mb/s. This would not pose a problem so long as there is not more than that amount of traffic to drop at a given household or the household had high capacity equipment such as a GigE router. The maximum current VDSL2 ring bandwidth in a symmetrical implementation is just over 200 Mb/s.

Figure 4:
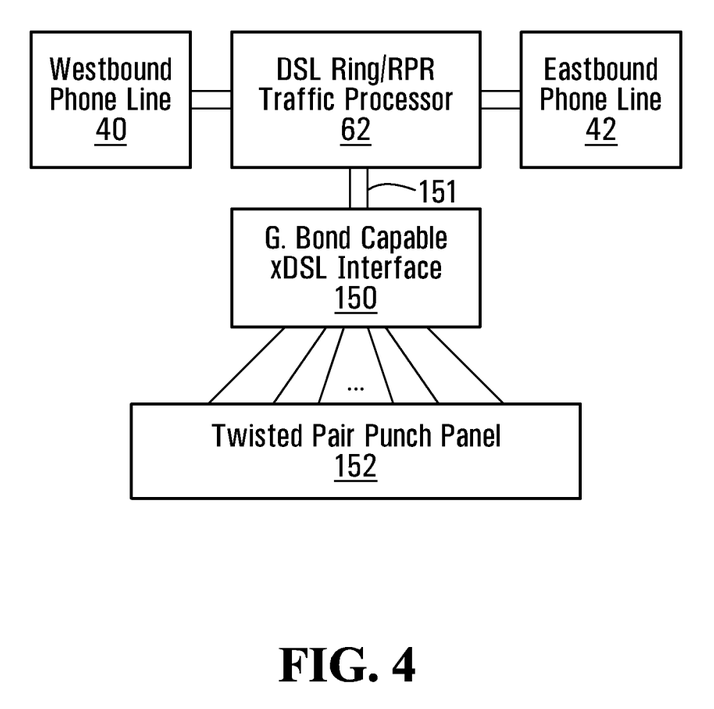
FIG. 4 is a block diagram of a gateway node.

In some embodiments, the gateway node 115 behaves very much the same as the HCC on any of the households. FIG. 4 shows additional functionality that might be included in some gateway node implementations. This includes a G.Bond-capable xDSL interface 150 and a twisted pair punch panel 152. More generally, any set of components capable of exchanging traffic with the main network and the DSL ring can be used. This can be included in a gateway node that also includes a traffic processor that is basically the same as in the HCC described above. In this case, the G.Bond-capable interface 150 behaves in the same way as a communications device on the above described HCC, and is shown connected to an add/drop port 151 of the traffic processor 62; the only difference here is that substantially all of the traffic will be going to/from that device, with the possible exception of any traffic that might be terminated at the gateway node per se. A gateway node may include additional communications interfaces such as USB port(s), WiFi ports etc. as described for the HCC.

As can be seen from FIG. 3, the G.Bond protocol 104 is used to obtain maximum bandwidth from the CO 100 to the pedestal 114. The gateway node 115, which maybe environmentally hardened and powered via the twisted pairs from the CO, terminates the G.Bond 104 traffic and acts as a gateway for the DSL ring.

In some embodiments, at each node in the ring is a full ADM, based on VDSL2. The DSL transmission distance starts at zero again on each individual hop. In most cases these hops back to the pedestal and then to the neighbour's house are less than 300 meters (<1000 ft). VDSL2 bandwidth at this distance is in the >100 Mb/s range (depending on VDSL2 chipset manufacturer's specifications and copper cable quality).

With rings there are two paths into and out of each house, each with the potential capability of carrying >100 Mb/s. Therefore the bandwidth potential for this scenario is potentially greater than 200 Mb/s (100 Mb/s Eastbound and 100 Mb/s Westbound) depending on the number of bonded pairs and the actual distance from the DSLAM to the pedestal. Basically the greater the number of subscribers on the ring, the greater the bandwidth pool available due to the greater number N of pairs available for bonding in the G.Bond 104 stream.

Rings also have the advantage of protecting themselves such that, if a single pair on the ring is cut, the traffic can be sent in the opposite direction to get to the gateway node. This is incredibly useful for maintenance purposes as well as adding and removing nodes (houses) to/from the ring. This allows for a deployment business case based on customer demand which eliminates the sunken investment in a 'build it and they will come' approach. This is also true of bonding so that houses can be added to the ring as subscribers sign up for the service.

In some embodiments, Local Loop Unbundling (LLU) is accomplished. In some embodiments this is achieved using the logical separation that is currently done via co-location in the CO (i.e., the traffic is carried by the incumbent from the customer to the CO and then handed off). In other embodiments, another gateway node is installed in the pedestal along with co-location in the CO. This allows for physical separation of the rings on a carrier-by-carrier basis. Space considerations in the pedestal may become an issue depending on the number of carriers that need to be supported in this fashion. A more pragmatic approach would have competitive carriers paying for the CPE (customer premises equipment) and jumper installation in the pedestal.

In another embodiment, a wireless interface can be used through which the reach of the wireline network can be extended to reach other devices not connected directly by wireline connections. A second set of households are connected in a similar manner as described for the main network (the network described in previous embodiments), with wireline connections between pairs of households in a linear manner that might form a ring or linear ADM for example. At least one of the households has a wireless connection to one of the households on the main network.

In some embodiments, as described above, a wireless interface is available for performing protection switching in the event of failure of one or more wireline connections.

In some embodiments, a wireless connection can be used between the endpoints of two linear ADM topologies to complete a ring topology.

In some embodiments, the ring transmission protocol is based on the IEEE 802.17 Resilient Packet Ring (RPR) standard with some modifications to allow for different possible bandwidths between nodes and overall lower peek bandwidths. RPR was designed for metro optical networks. Ethernet-based rings, implementing Ethernet Automatic Protection Switching (EAPS) according to ITU-T Recommendation G.8031/Y.1342, for instance, are also contemplated.

In the embodiments described, packet add/drop functionality is included in each node to add/drop packets. More generally, traffic add/drop functionality is included. This might include packet add/drop functionality, or traffic implemented using timeslots or wavelengths/frequencies to name a few specific examples.

In some embodiments, the packet add/drop is in respect of DSL communication. This may for example be ADSL (Asynchronous DSL), ADSL2+, SDSL (Symmetric DSL), Uni-DSL (Universal DSL), VDSL (Very high bit rate DSL), and VDSL2 (Very high bit rate DSL version 2) or a future iteration of DSL that may or may not include Dynamic Spectrum Management (DSM) functionality.

Embodiments of the present invention may be used to maintain the protection of lifeline services in the case of power outage. In short, in economic and marketing terms, this may provide a compelling service differentiator for telcos over cable companies. Stated simply, it is possible for POTS, which runs on twisted pair cables between a CO and a pedestal or between a CO and nodes at the ends of a DSL Ring, to remain in a DSL Rings implementation and be used to supply power to at least DSL Ring circuitry, and possibly also a subscriber device and associated port such as an "old black telephone" for instance, via its 23-120 mA current at −42V to −60V.

Implementation of a POTS support option may take into account significant amounts of hardware integration to minimize power requirements on the deployed circuitry. For example, the G.Bond interface on a gateway node, also referred to herein as a Convergence Node (CN) or more generally as a network node, might utilize chips that can support multiple xDSL ports at low power consumption. Similarly, an HCC or other home/subscriber equipment or node might support a physical power separation between the Ring and home/subscriber interfaces.

Figure 5:
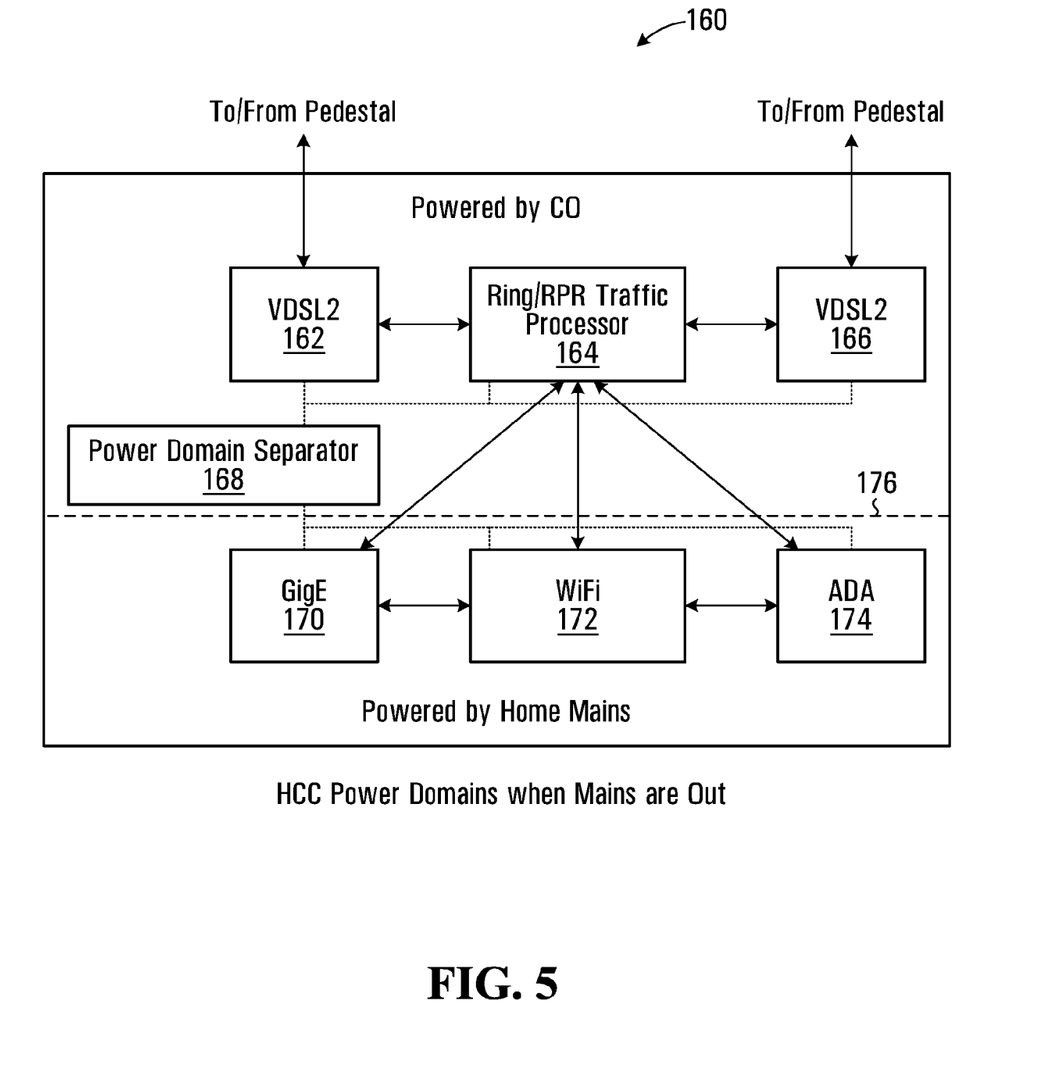
FIG. 5 is a block diagram of another example HCC.

FIG. 5 is a block diagram of another example HCC 160, in which DSL Ring components including a Ring/RPR traffic processor 164 and VDSL2 Ring interfaces 162, 166 can be powered by the CO through the pedestal when mains power at the subscriber premises fails. The power domain separator 168 represents an example of a powering arrangement that might be connected to components of a subscriber node to allow both DSL Ring components and subscriber-side interfaces 170, 172, 174 to be powered by mains power under normal conditions, and to allow at least the DSL Ring components to be powered remotely from the pedestal, as indicated by the dashed line 176. Thus, the power supplied by "Household Mains" might be provided via an interface such as one that is compliant with the Power-Over-Ethernet (POE) standard. This approach allows for the ring bandwidth to be maintained in the case of a power outage or a consumer not paying their power bill and being individually shut off.

A power domain separator 168 might include one or more power diodes, relays, switches, or more complicated electronic circuits.

The specific example shown in FIG. 5 is intended solely for illustrative purposes. Other delineations between power domains are also possible, to allow certain subscriber-side equipment to be powered, for instance. Power domains may also vary depending on the particular components implemented at a Ring device. A gateway node or CN at a pedestal, for example, might be powered by local power under normal circumstances and entirely powered remotely through twisted pairs in the event of an outage. In the case of the HCC shown in FIG. 2, all components except the subscriber interfaces at the bottom of the Figure might be on the CO side of a power domain separator.

A powering arrangement might also be implemented differently than specifically shown in FIG. 5. A power converter might be provided to convert the voltage and/or current level on a twisted wire pair to a voltage and/or current level for use by any components that are to be remotely powered.

Further variations may be or become apparent to those skilled in the art.

Figure 6:
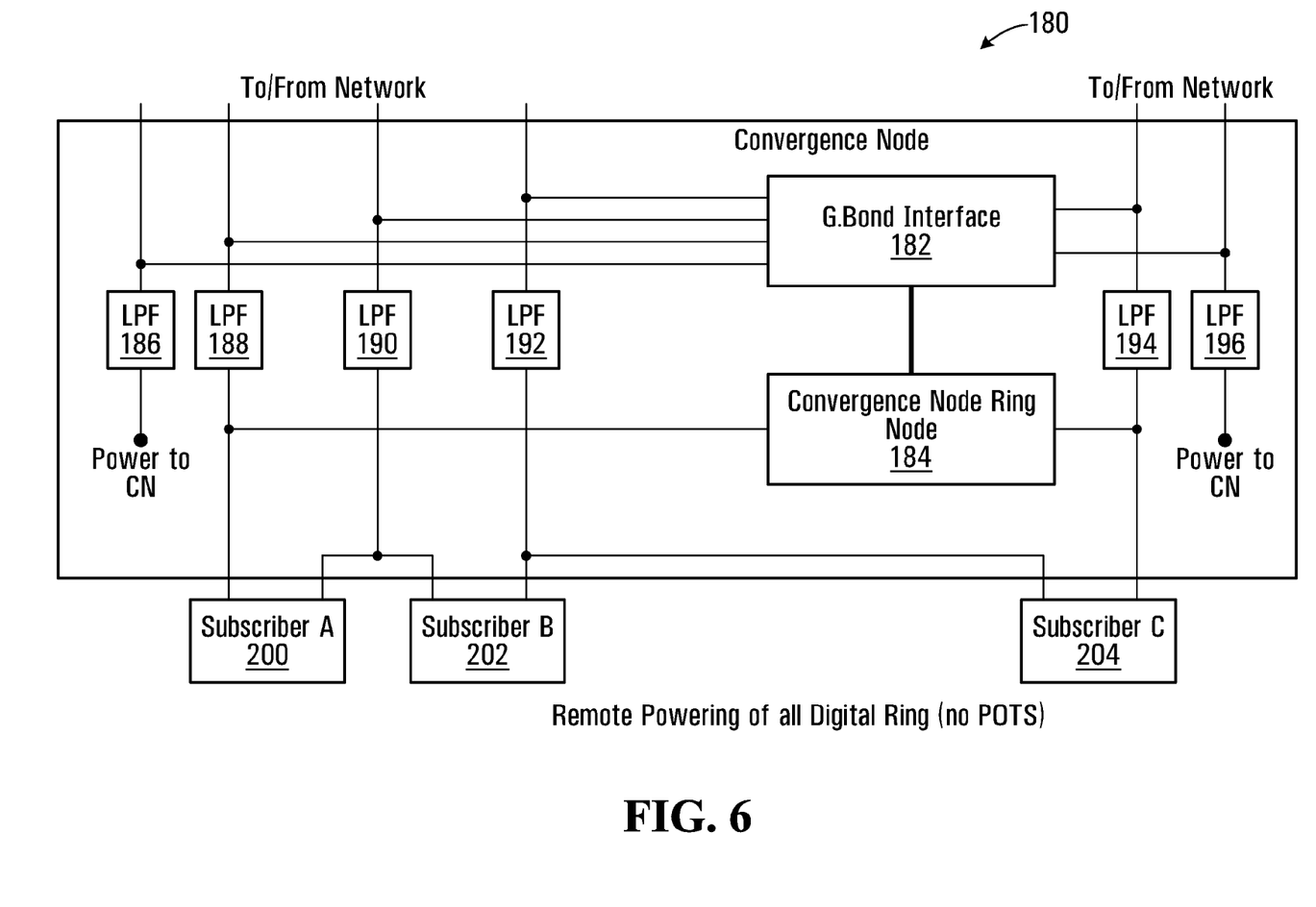
FIG. 6 is a block diagram of a remotely powered CN (Convergence Node, may also be referred to as a gateway node) with POTS support.

FIG. 6 is a block diagram of a CN 180 with the various twisted pairs connecting to it and various sources of power while maintaining POTS support through the LPFs 186, 188, 190, 192, 194, 196. Basically the power domain separator (shown in FIG. 5), which could be provided in an HCC at each of the subscriber premises 200, 202, 204, is unidirectional in nature and allows the household mains to power the entire HCC in all cases other than power failure. In the case of power failure, the current is entirely supplied from the CN 180, which gets its current supplied by the twisted pairs from the CO. Once a certain number of homes lose power (implementation dependent) the CN 180 might no longer be capable of operating the ring due to lack of sufficient power.

At this point, the CN 180 may shut down until power is back up. All pairs might then revert to POTS to provide network connectivity to subscribers. While the CN 180 is shut down, POTS will be available to the subscriber premises 200, 202, 204 serviced by that CN. In this scenario, there is POTS available at all times, even when the power is on. When the power is off, there are simply no ring communications on the higher frequencies. It is also possible that the POTS functionality may be controlled by a relay on each HCC which makes all voice calls VoIP when the power is on and, when the power fails, opens to POTS.

Any of various power/current levels are possible, and may be implementation dependent. For example, telecom twisted pair current varies in the range of 23-120 mA and allowable operating voltage is between −42V and −60V often depending on country and equipment provider. The power consumption of the CN 180 will be dependent on the components that make up the CN and their level of integration. At present, most telecom line cards supply 25-45 mA of −46Vdc to −52Vdc, which provides a total of 1.15 W-2.34 W of power. Power conversion efficiencies are then applied to arrive at the total available power/pair. These conversion efficiencies are in the range of 80-90% in some embodiments.

One possible implementation involves the diode OR'ing of all incoming lines, thereby increasing supplied current from 23-120 mA per single line to a total captured current of N×(23-120 mA) per N incoming lines.

As every pair that passes through the CN 180 may be used to supply the CN with power, the consumption of the CN implementation will determine the minimum number of pairs necessary for proper CN operation. Basically, there will be pairs that come as far as the CN 180 but do not extend to subscribers (See FIG. 6). These pairs, two of which are shown in FIG. 6 which provide power to the CN 180 through the LPFs 186, 196, can be used by the G.Bond interface 182 and the CN ring node 184 for DSL traffic but can also be used to provide power for other components of the CN 180. The pairs that connect to the G.Bond interface 182 in the CN 180 and are routed through to the home gateways, which in FIG. 6 connect to the subscriber premises 200, 202, 204 through the LPFs 188, 190, 192, 194, can also provide power to the home gateways in the case of mains power failure. In one embodiment, pairs that are supplying power to the home gateways are not also used to supply power to the CN itself. If the power goes out in an entire neighbourhood, the ring may still be powered if the CN 180 can be powered according to the following:

$$Pairs_{CN}=\text{Total \# of Pairs}-2-(\text{\# of houses on Ring}-1).$$

The number 2 comes from the pairs that power the two end links (to and from the CN Ring Node—see 184 in FIG. 6). Since these pairs are being separately accounted for, the number 1 is also used in the "# of houses on Ring" term. For the most common case of 2 pairs/house as the Total # of Pairs, this equation reduces to:

$$Pairs_{CN}=\text{\# of houses on Ring}-1.$$

The $Pairs_{CN}$ variable represents the number of pairs whose supply current is entirely dedicated to providing the CN 180 with power. Those pairs may still be connected to the G.Bond interface 182 to provide additional data connectivity to the CO. To arrive at the power available to the CN 180, specific parameters of the supplied current and voltage are used. For example, where:

Current=30 mA;

Voltage=−50V;

Number of houses on ring=5;

Number of pairs/house=2 (10 pairs total); and

Power conversion efficiency=85%, the total dedicated power available to the CN 180 becomes:

4 pairs×0.85×0.03×50=5.1 W.

The total power that will be available to the CN 180 under normal operating conditions in this example would be:

10 pairs×0.85×0.03×50=12.75 W.

If only a single house was without power in this example, two pairs may be used to supply power to components at that house, in which case:

2 pairs×0.85×0.03×50=2.55 W would be available to power the Ring components from the CN/network.

To maintain POTS connectivity in the case of power failure is a worthy goal in that it maintains communications connectivity in trying circumstances. However, telcos are looking at ways of removing their POTS infrastructure to move to a more Internet-like infrastructure that will reduce their capital and operating costs (CAPEX & OPEX).

Internet connectivity has generally been considered a relatively cheap "nice-to-have" but not something with 5 9's reliability. The investment simply hasn't been made to keep this level of reliability in Internet-type equipment.

There are other methods of providing power to the remote equipment. For example, a larger DC voltage/current could be received on the twisted pairs by the CN, where it gets terminated and the standard POTS voltage/current is injected towards the home (see FIG. 7). A current limited version of 23-120 mA per single line, for example, could be generated at the CN and sent to each individual line to each HCC for safety reasons. As in FIG. 6, the CN 210 in FIG. 7 includes a G.Bond interface 212, a CN ring node 214, LPFs 216, 218, 220, 222, 224, 226, and is connected to three subscriber premises 230, 232, 234. The CN 210 also include a gateway power supply 228. In this specific case the gateway power supplied by the gateway power supply 228 might be −48Vdc but there is no POTS connectivity back to the CO. To be clear, there is no POTS signalling possible in this configuration. The Ring provides communications service to subscriber premises 230, 232, 234, but POTS is not supported. This approach allows for fewer pairs to supply more power to the remote equipment. The trade off is that there are additional safety concerns for telecom technicians when handling the wires than with the current infrastructure. The subscriber would not theoretically be at any further risk since the same voltage/current as the existing system would be passed to the home.

Figure 7:
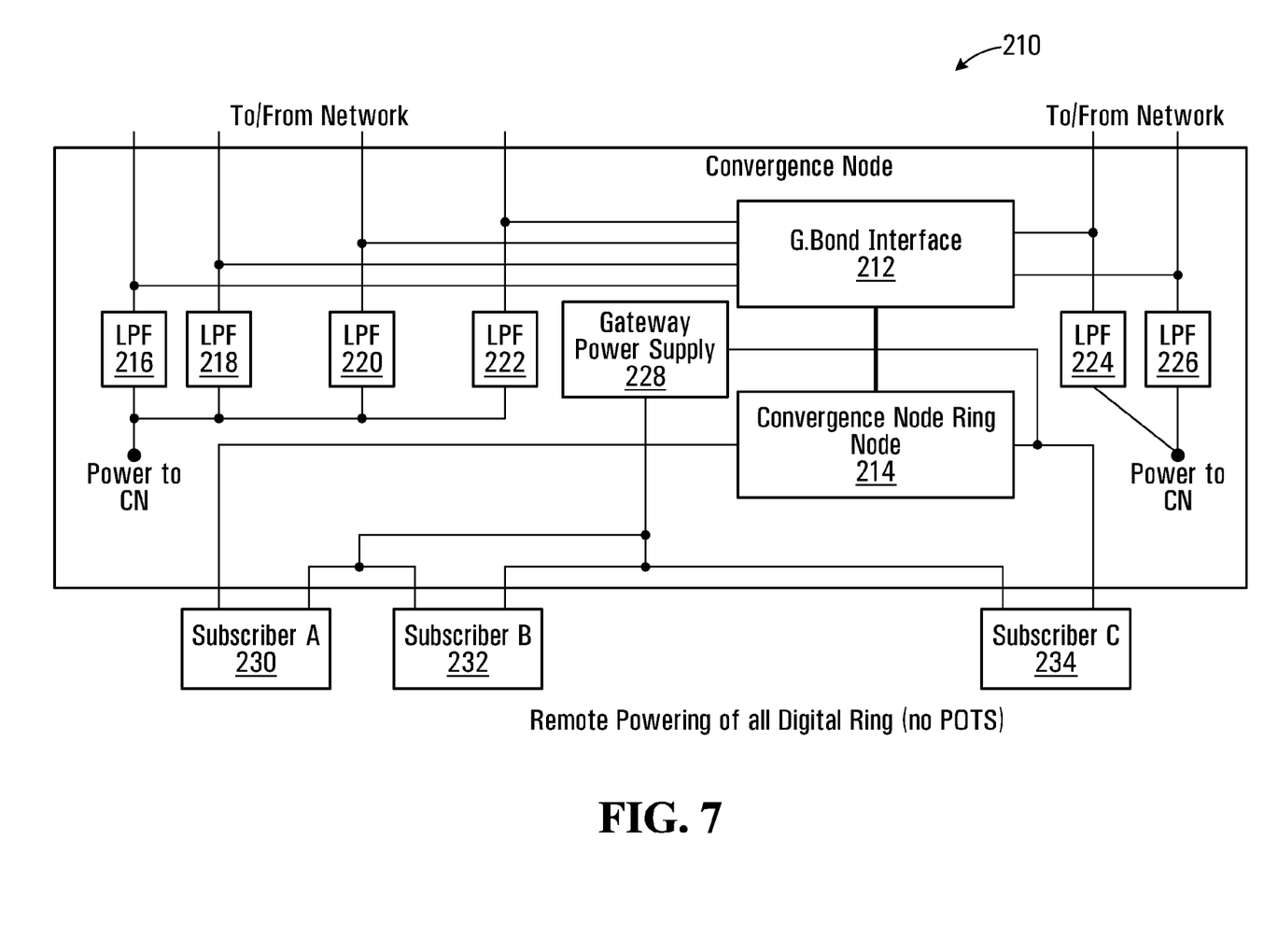
FIG. 7 is a block diagram of a remotely powered CN without POTS support.

Another method is to entirely "digitize" the loop (again, see FIG. 7). What this means is that POTS is completely eliminated from the loop. In DSL terms channel 0 (the lowest frequency channel that is generally allocated for POTS) can now be used to increase available digital Internet bandwidth. In this scenario, power can still be provided to the home gateway node in whatever voltage/current ratio the equipment provider/telecom carrier decides as the household will not be exposed to it; however, their technicians will. For example, 200Vdc could be sent from the CO to the CN 210 and simply passed onwards to the HCC at each subscriber premises 230, 232, 234. Each HCC could then divide down this voltage so that it provides a "Pseudo POTS" port into the house operating at −48Vdc. This voice traffic is then converted at the HCC into data packets and passed around the Ring.

What this provides is an outlet that "old black phones" can be plugged into in the case of household mains failure. Most VoIP-based voice appliances require connection to household mains to generate their Ethernet signal. This phone port is powered from the HCC in the CO Powered domain (see FIG. 5).

In the above examples, the CN, or more generally a network node, includes some sort of powering arrangement, in the form of a simple connection, a power converter, and/or a power distributor or controller, that allows the network node to derive its own power from twisted pairs connected to a CO or other upstream equipment, and to remotely power subscriber nodes.

Figure 8:
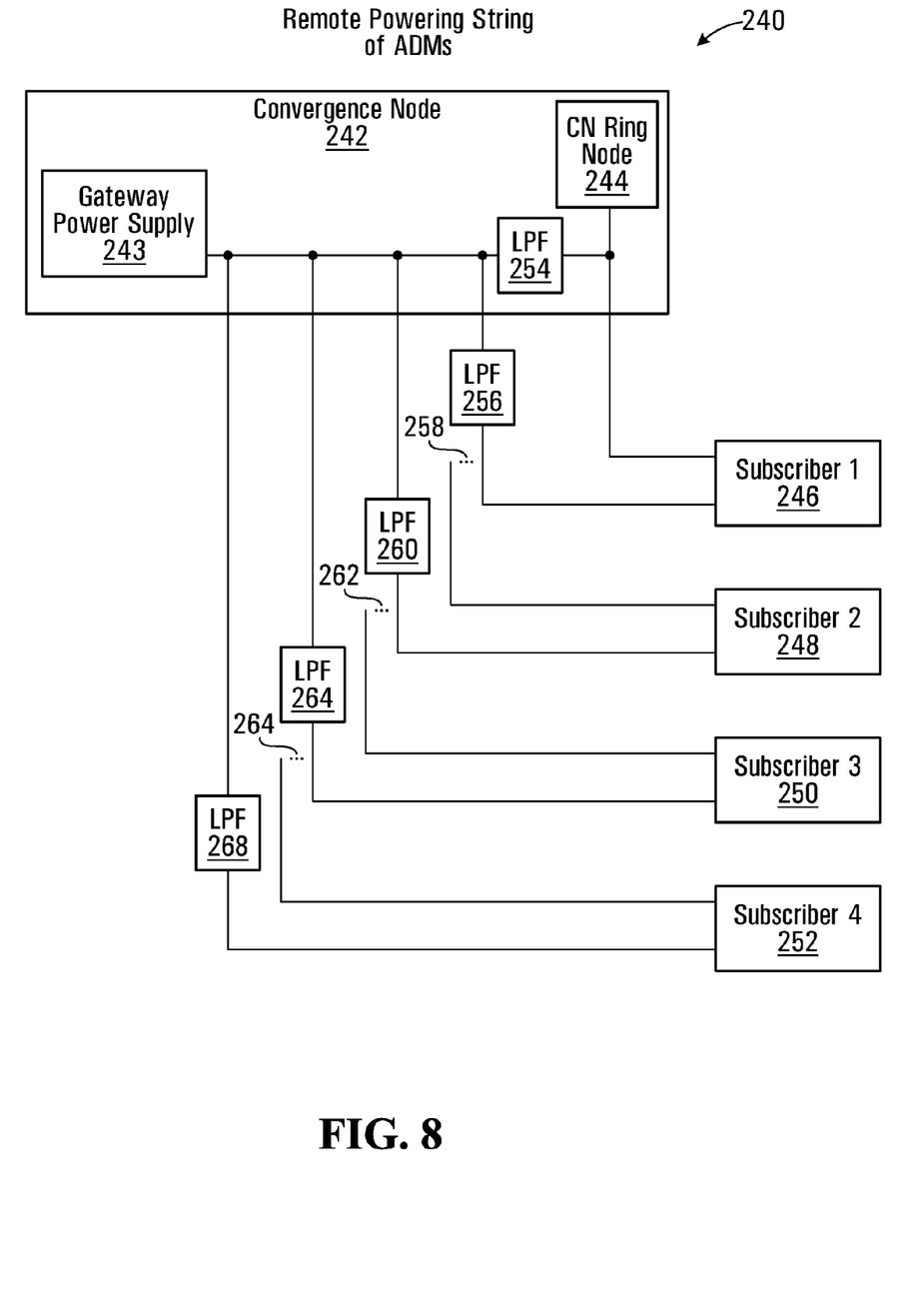
FIG. 8 is a block diagram of a remotely powered string of ADMs (Add/Drop Multiplexers) and/or regenerators.

Strings of Add/Drop Multiplexers (ADMs) and/or regenerators may be powered in a fashion as shown in FIG. 8. This configuration, which shows subscriber premises 246, 248, 250, 252 interconnected to each other and with a CN ring node 244 and a gateway power supply 243 at a CN 242 through LPFs 254, 256, 260, 264, 268 and jumpers 258, 262, 266, allows for substantially higher bandwidth to the homes that are further away from the CO while still being able to provide power in emergency situations. The jumpers 258, 262, 266, in intermediate splice boxes in the example shown, reduce the transmission distance that the VDSL2 would have to contend with, and mean that the VDSL2 transmission distance does not have to go all the way back to the CN 242 between nodes on the Ring or string. However, those pairs still physically exist at the splice box from the pedestal/CN. As such they can be re-used to provide power to the ADMs at the subscriber premises 246, 248, 250, 252 as shown in the diagram.

What has been described is merely illustrative of the application of principles of embodiments of the invention. Other arrangements and methods can be implemented by those skilled in the art without departing from the scope of the present invention.

For example, a power cell such as a micro nuclear power cell, or a trickle-charged battery-back-up could be provided in addition to power mains as a local power source for a subscriber or network node. Such a power cell or battery could be part of the HCC power supply 60 in FIG. 2 or the gateway power supply 228 in FIG. 7 in the case of a CN. A battery or other rechargeable power source could be charged from power mains, a POTS feed or other feed from a CN or CO, or possibly both. This may also be a form of surge suppression.

Another potential variation relates to more of a separation between communications and power connections. The traffic feed to a CN could be fiber-based instead of G.Bond, for instance. Power could still be provided through the twisted pairs, but the traffic would come from the optical fiber. Depending on the optical components used and the number of houses on a ring, this may require less power overall. This could also be applied to individual subscribers connected in an optical ring (i.e., keep the twisted pairs to power the system in an outage situation but use a fiber-ring to provide all the data connectivity).

We claim:

1. A subscriber communication node comprising:
network communication components that enable the subscriber communication node to communicate with a gateway node and other subscriber communication nodes in a ring topology through electrically conductive twisted wire pairs, the gateway node being located at a pedestal and enabling communication with a network switching device, the electrically conductive twisted wire pairs running between the pedestal and the subscriber communication node;
subscriber communication components, operatively coupled to the network communication components, that enable one or more subscriber communication devices to communicate with the network communication components; and
a powering arrangement that enables subscriber communication node components including at least the network communication components to be powered either by a local power source or remotely through the electrically conductive twisted wire pairs,
wherein a first electrically conductive twisted wire pair at the subscriber communication node is connected to a second electrically conductive twisted wire pair at an adjacent subscriber communication node in the ring topology through a connection between the first and second electrically conductive twisted wire pairs at the pedestal.

2. The subscriber communication node of claim 1, wherein the powering arrangement comprises a power domain separator operatively coupled between the local power source and the subscriber communication node components that are to be powered either by the local power source or remotely.

3. The subscriber communication node of claim 2, wherein the power domain separator comprises one or more of: a diode, a switch, and a relay.

4. The subscriber communication node of claim 1, wherein the electrically conductive twisted wire pairs and the powering arrangement further support Plain Old Telephone Service (POTS) communications for a subscriber communication device.

5. The subscriber communication node of claim 1, wherein the electrically conductive twisted wire pairs are driven at a powering current and/or voltage level that is different from a communication current and/or voltage level.

6. The subscriber communication node of claim 1, wherein the powering arrangement comprises a power converter that converts a voltage and/or current level on the electrically conductive twisted wire pairs to a voltage and/or current level for use by the components to be powered either by the local power source or remotely.

7. The subscriber communication node of claim 1, wherein the network communication components comprise an ADM (Add/Drop Multiplexer).

8. The subscriber communication node of claim 1, wherein the network communication components enable the subscriber communication node to communicate with the gateway node and the other subscriber communication nodes via DSL (Digital Subscriber Line) communications.

9. The subscriber communication node of claim 8, wherein the DSL communications are of a type selected from a group consisting of: ADSL (Asynchronous DSL), ADSL2+, SDSL (Symmetric DSL), Uni-DSL (Universal DSL), VDSL (Very high bit rate DSL), and VDSL2 (Very high bit rate DSL version 2).

10. The subscriber communication node of claim 1, wherein the local power source comprises one or more of: household power mains, a power cell, and a battery.

11. The subscriber communication node of claim 10, wherein the battery is charged by the household power mains or remotely through the electrically conductive twisted wire pairs.

12. A method comprising:
providing electrically conductive twisted wire pairs between a pedestal and a subscriber communication node, the subscriber communication node comprising:
network communication components that enable the subscriber communication node to communicate with a gateway node and other subscriber communication nodes in a ring topology through the electrically conductive twisted wire pairs, the gateway node being located at the pedestal and enabling communication with a network switching device, the electrically conductive twisted wire pairs running between the pedestal and the subscriber communication node;

subscriber communication components that enable one or more subscriber communication devices to communicate with the network communication components; and a powering arrangement, the method further comprising:

the powering arrangement powering at least the network communication components of the subscriber communication node remotely through the electrically conductive twisted wire pairs and the network switching device where a local power source of the subscriber communication node becomes unavailable, wherein providing comprises providing a first electrically conductive twisted wire pair at the subscriber communication node connected to a second electrically conductive twisted wire pair at an adjacent subscriber communication node in the ring topology through a connection between the first and second electrically conductive twisted wire pairs at the pedestal.

13. A network node comprising a gateway node for a pedestal, the network node comprising:

a twisted wire pair interface for connection to a plurality of twisted wire pairs, the plurality of twisted wire pairs being operatively coupled to a network switching device;

communication components that enable subscriber communication nodes, associated with communication service subscribers and interconnected with the network node in a ring topology through the twisted wire pairs, to communicate with the network switching device;

a powering arrangement that enables the communication components and/or the subscriber communication nodes to be powered remotely through the twisted wire pairs, and wherein a first electrically conductive twisted wire pair at the subscriber communication node is connected to a second electrically conductive twisted wire pair at an adjacent subscriber communication node in the ring topology through a connection between the first and second electrically conductive twisted wire pairs at the pedestal.

14. The network node of claim 13, wherein the communication components further support Plain Old Telephone Service (POTS) communications with the subscriber communication nodes.

15. The network node of claim 13, wherein the twisted wire pairs are driven at a powering current and/or voltage level that is different from a communication current and/or voltage level.

16. The network node of claim 13, wherein the powering arrangement comprises a power converter that converts a voltage and/or current level on the twisted wire pairs to a voltage and/or current level for use by the communication components and/or the subscriber communication nodes.

17. The network node of claim 13, wherein the communication components enable the subscriber communication nodes to communicate with the network switching device via DSL (Digital Subscriber Line) communications.

18. The network node of claim 17, wherein the DSL communications are of a type selected from a group consisting of: ADSL (Asynchronous DSL), ADSL2+, SDSL (Symmetric DSL), Uni-DSL (Universal DSL), VDSL (Very high bit rate DSL), and VDSL2 (Very high bit rate DSL version 2).

19. The network node of claim 13, wherein the powering arrangement further enables the network node to be powered from a local power source, or remotely from the network switching device as a backup to the local power source.

20. The network node of claim 19, wherein the plurality of twisted wire pairs comprises twisted wire pairs that are operatively coupled to the subscriber communication nodes and can be used to power the subscriber communication nodes, and twisted wire pairs that terminate at the network node and can be used to power the communication components.

21. The network node of claim 19, wherein the local power source comprises one or more of: power mains, a power cell, and a battery.

22. The network node of claim 21, wherein the battery is charged by the power mains or remotely through the twisted wire pair.

23. The network node of claim 13, wherein the network switching device is selected from a group consisting of a central office, a DLC (digital loop carrier) node, a fiber-fed node, and a network POP (point of presence) node.

24. A method comprising:

providing a plurality of twisted wire pairs between a network switching device and subscriber communication nodes through a network node, the network node comprising communication components that enable the subscriber communication nodes, associated with communication service subscribers and interconnected with the network node in a ring topology through the twisted wire pairs, to communicate with the network switching device; and the network switching device powering the communication components and/or the subscriber communication nodes remotely through the network node and the twisted wire pairs, wherein providing comprises providing a first electrically conductive twisted wire pair at a subscriber communication node connected to a second electrically conductive twisted wire pair at an adjacent subscriber communication node in the ring topology through a connection between the first and second electrically conductive twisted wire pairs at the network node.

25. A wireline network comprising:

at least one network connection connecting at least one telephony network switching device at a pedestal to a respective first customer communication node;

a plurality of second customer communication nodes;

a plurality of interconnections between the customer communication nodes such that the customer communication nodes are interconnected in a ring topology through the interconnections and have at least one communication path to the network switching device, the interconnections comprising electrically conductive twisted wire pairs that run between the pedestal and a second customer communication node; and a powering arrangement in each customer communication node to provide power to at least some components of the customer communication nodes from the electrically conductive twisted wire pairs, wherein a first electrically conductive twisted wire pair at a second customer communication node is connected to a second electrically conductive twisted wire pair at an adjacent second customer communication node in the ring topology through a connection between the first and second electrically conductive twisted wire pairs at the pedestal.

26. A subscriber communication node comprising:

network communication components that enable the subscriber communication node to communicate with a gateway node and other subscriber communication nodes in a ring topology through electrically conductive twisted wire pairs, the gateway node being located at a pedestal and enabling communication with a network switching device, the electrically conductive twisted wire pairs running between the pedestal and the subscriber communication node;

subscriber communication components, operatively coupled to the network communication components, that enable one or more subscriber communication devices to communicate with the network communication components; and a powering arrangement that enables subscriber communication node components including at least the network communication components to be powered either by a local power source or remotely through the electrically conductive twisted wire pairs, wherein a first electrically conductive twisted wire pair at the subscriber communication node is connected to a second electrically conductive twisted wire pair at an adjacent subscriber communication node in the ring topology through a connection between the first and second electrically conductive twisted wire pairs at an intermediate location between the pedestal and the subscriber communication nodes.

\* \* \* \* \*